(12) United States Patent
Bartlett (10) Patent No.: US 6,763,628 B1
(45) Date of Patent: Jul. 20, 2004

(54) FLY CASTING TRAINER AND METHOD OF TEACHING FLY CASTING

(76) Inventor: Norman Bartlett, 2617 Franklinville Rd., Joppa, MD (US) 21085

( * ) Notice: Subject to any disclaimer, the term of this patent is extended or adjusted under 35 U.S.C. 154(b) by 357 days.

(21) Appl. No.: 09/715,684

(22) Filed: Nov. 17, 2000

Related U.S. Application Data (60) Provisional application No. 60/166,373, filed on Nov. 17, 1999.

(51) Int. Cl.$^7$ .............................................. A01K 87/08
(52) U.S. Cl. .............................. 43/4; 43/18.1 R; 43/25; 43/23
(58) Field of Search .............................. 43/18.1 R, 25, 43/23, 4, 4.5; 16/436, 430

(56) References Cited

U.S. PATENT DOCUMENTS

| | | | | |
|---|---|---|---|---|
| 1,013,333 A | * | 1/1912 | Tredwell | 43/23 |
| 1,961,969 A | * | 6/1934 | Heddon | 43/18.1 R |
| 2,065,153 A | * | 12/1936 | Proudfit | 43/25 |
| 2,212,212 A | * | 8/1940 | Planitz | 43/25 |
| 2,653,406 A | * | 9/1953 | Grabiak et al. | 43/25 |
| 2,685,755 A | * | 8/1954 | Gorenflo | 43/23 |
| 2,711,047 A | * | 6/1955 | Shephard | 43/23 |
| 2,759,288 A | * | 8/1958 | Bratek | 43/18.1 R |
| 3,791,063 A | * | 2/1974 | Harker | 43/4.5 |
| 4,559,735 A | * | 12/1985 | Batick, Jr. | 43/25 |
| 4,845,879 A | * | 7/1989 | Urso | 43/18.1 R |
| 5,133,101 A | * | 7/1992 | Hauser et al. | 16/430 |
| 5,297,355 A | * | 3/1994 | O'Brien | 43/4 |
| 5,509,228 A | * | 4/1996 | Wright, Jr. | 43/23 |
| 5,771,535 A | * | 6/1998 | Blessing | 16/430 |
| 6,016,621 A | * | 1/2000 | Maeda | 43/18.1 R |
| 6,092,324 A | * | 7/2000 | Lepage et al. | 43/23 |
| 6,199,245 B1 | * | 3/2001 | Blessing | 16/436 |
| 6,263,609 B1 | * | 7/2001 | Kollodge et al. | 43/25 |
| 6,295,755 B1 | * | 10/2001 | Macaluso | 43/25 |
| 6,347,477 B1 | * | 2/2002 | Hopper | 43/25 |
| 6,412,211 B1 | * | 7/2002 | Smith | 43/4 |

FOREIGN PATENT DOCUMENTS

| JP | 2000-324995 B1 | * | 11/2000 |
|---|---|---|---|
| JP | 2001-197850 B1 | * | 7/2001 |

* cited by examiner

*Primary Examiner*—Darren W. Ark
(74) *Attorney, Agent, or Firm*—Law Offices of Royal W. Craig

(57) ABSTRACT

A fly cast training device that allows an instructor to take the lead in controlling the casting while the trainee follows along, and to gradually relinquish control to the trainee to instill the proper muscle memory through repetition. The fly cast training device generally comprises a flexible shaft section, a butt section, a spool attached to said butt section, and a multiple-handle assembly attached between the flexible shaft section and the butt section. The handle assembly includes a plurality of handle sections secured together at both ends in a spaced relation by a pair of brackets. The handle assembly may include two or three handles. The flexible shaft section and butt section may be attached centrally of the handles, or a second handle can be attached to in the existing handle of a conventional fly rod and offset there from by brackets. To use the above-described multi-handle fly casting rod, the instructor stands side-by-side with a trainee and grips one of the handles while the trainee grips the other. The trainer then initiates proper fly casting while the trainee follows along, and gradually relinquishes control of the casting to the trainee to allow development of a muscle memory that is a reflection of proper fly casting. Alternatively, an experienced fly fisherman may use the device to improve ambidexterity in casting. The experienced fly fisherman grips both handles of the device and initiates proper fly-casting with the dominant hand while the weaker hand follows along. Gradually, control of the cast is transferred to the weaker hand to allow development of a muscle memory that is a reflection of proper fly casting.

3 Claims, 7 Drawing Sheets

FLY CASTING TRAINER AND METHOD OF TEACHING FLY CASTING

CROSS-REFERENCE TO RELATED APPLICATIONS

The present application is based on U.S. provisional application Serial No. 60/166,373 filed on Nov. 17, 1999 by Norman Bartlett for his "FLY CASTING TRAINER AND METHOD OF TEACHING FLY CASTING".

BACKGROUND OF THE INVENTION

1. Field of the Invention

The present invention relates to fly fishing and more particularly, to a fly casting trainer and method of teaching fly casting to enable an instructor to impart a muscle memory of the proper casting form to a trainee.

2. Description of the Background

Fly casting raises the sport of fishing to an art, and recent publicity has sparked a renaissance in fly fishing. However, the proper casting technique is at least as complex yet not so well documented as the golf swing, tennis serve, etc. As a result, experienced instructors are finding themselves to be in great demand by novices seeking training.

The goal of fly casting is to deliver a substantially weightless fly to a pinpoint target, using line weight for momentum. Fly casting is the only way to deliver such light weight lures, hence the only way to catch a fish that feeds upon insects. A fly cannot be cast using conventional line because it cannot develop the necessary momentum. Thus, the fly-fisherman relies upon a weighted line to deliver the fly. The line may float or sink once it hits the water, but it has enough weight to deliver the fly many feet away. The thick fly line is separated from the fly by a monofilament leader. To cast the fly properly, the experienced fisherman will pull 8–10 feet of fly line out beyond the tip of the fly rod. The then pulls 20–30 feet of fly line off the reel and holds it, coiled, in his free hand. The fisherman then uses a quick rhythmic back-and-forth flicking motion, using right forearm and wrist, with the tip of the fly rod pivoting from vertical to horizontal. The fly line moves through the air in an elongate arc that opens up and flattens out as it approaches the water. Typically, this is done a few times without letting the fly hit the water, and each time some of the coiled fly line is released to lengthen the cast. Finally, the fisherman lets the fly, leader, and line settle gently to the water. The fisherman begins to retrieve line manually, and each pull of the line with the free hand makes the fly dart through the water as if it were alive. When the fly has been fully retrieved without a strike, the process begins anew.

The skill necessary to cast well is a combination of "touch", eye-hand coordination, and timing. With proper technique, the line should form a loop as the rod moves forward and then straighten beyond the tip of the rod, forming a line that is parallel to the ground. After the forward cast, a similar back cast retrieves the line. The line will travel back and forth properly given a proper back-and-forth motion of the forearm and rod, working together as a single unit. The forward cast begins with the elbow positioned comfortably at the side, at about waist level. During the back cast it should come up to the level of the shoulder, returning to that relaxed position at your side at the completion of the forward cast. The timing of the entire cast is important, and the tip of the rod should move in a straight plane often at or approaching vertical during the forward cast. Generally, it takes significant training and then practice to learn the proper casting technique. Since the technique is more a function of touch and feel, direct hands-on practice is a far more efficient way to learn than watching visual demonstrations, reading books, or watching video tapes.

There have been prior efforts to develop practice aids for fly casting. For example, U.S. Pat. No. 5,297,355 discloses a fly fishing practice device that uses a target that gives off visual or aural indications when the target is hit by a simulated fly. However, these are solely for use by the trainee.

For the instructor's part, the most effective teaching method is to impart a "muscle memory" to the trainee whereby they can automatically replicate the feel and timing of proper fly casting. The same muscle memory approach has long been used by golf and tennis instructors with success. Muscle memory training preferably begins with the trainee following the instructor's lead and gradually taking full control so that muscle memory can develop through repetition. This is readily possible in golf or tennis because the instructor can stand behind the trainee and exert as much control over the stroke as necessary, gradually relinquishing all control. However, the same approach is awkward with a fly rod since one hand is used for casting and the other for line control. Moreover, there are no known teaching aids that allow the instructor to participate in the trainee's cast. It would be greatly advantageous to provide a training implement to enable an instructor to impart a muscle memory of the proper back-and-forth motion of the forearm and rod to a fly casting trainee.

SUMMARY OF THE INVENTION

It is, therefore, an object of the present invention to provide a fly cast training device that allows an instructor to take the lead in controlling the casting process while the trainee follows along and to gradually relinquish control to the trainee to instill the proper muscle memory through repetition.

It is another object of the present invention to provide a fly cast training device that allows an experienced fly fisherman to self-teach opposite-hand fly casting by instilling muscle memory from the experienced casting hand to the inexperienced casting hand.

According to the present invention, the above-described and other objects are accomplished by providing various embodiments of a fly casting training device and method of use thereof for teaching fly casting.

Generally, the device comprises a flexible shaft section, a butt section, a spool (a.k.a. reel) attached to said butt section, and a multiple-handle assembly attached between the flexible shaft section and the butt section. The handle assembly includes a plurality of handle sections secured together at both ends in a spaced side-by-side relation by a pair of brackets. The handle assembly may include two or three handle sections. The flexible shaft section and butt section may be attached to the supporting brackets centrally of the handles. Alternatively, a conventional fly rod may be used and a second handle attached to the existing handle and offset there from by said brackets. As yet another alternative, the handle assembly may be attached below the butt section.

In all embodiments (just as with conventional fly rods), the flexible shaft section and butt section may be integrally joined or may be separate sections connected by ferrules as is known in the art. The multiple-handle assembly may be constructed by die casting, forging, sand or injection molding, or any other appropriate and known methods of fabrication, and the multiple-handle assembly may be attached between the flexible shaft section and the butt section by rivets, bolts, welding, glue or any other known attachment means. Alternatively, the entire rod inclusive of the flexible shaft section, butt section and multiple-handle assembly may be formed as an integral unit by molding, die casting, etc. It is to be understood, therefore, that the invention may be constructed other than as specifically set forth herein.

The present invention also includes the method for teaching fly casting using any of the above-described multiple-handle fly casting rods. The method comprises the steps of standing side-by-side with a trainee and gripping one of the handles while the trainee (grips the other, initiating proper fly casting while the trainee follows along, and gradually relinquishing control of the casting to the trainee to allow development of a muscle memory that is a reflection of proper fly casting. Alternatively, the method comprises the steps wherein an individual grips both handles, initiates proper fly casting technique with the dominant hand while the weaker hand follows along, and gradually transfers control of the casting to the weaker hand to allow development of a muscle memory that is a reflection of proper fly casting, and to develop ambidexterity in casting.

DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
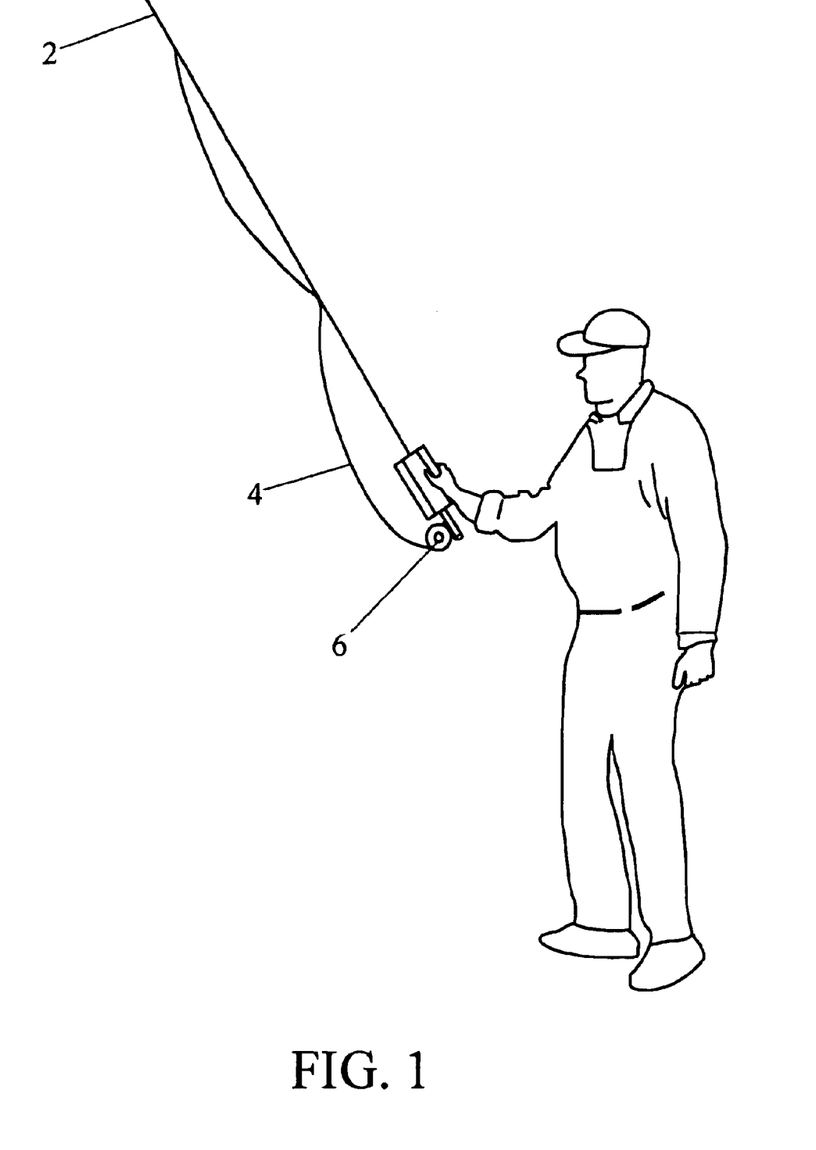
FIG. 1 is a perspective photo of a fly fisherman equipped with standard equipment inclusive of a conventional fly rod 2, weighted fly line 4 and spool 6.

FIG. 1 is a perspective photo of a fly fisherman equipped with standard equipment inclusive of a conventional fly rod 2, weighted fly line 4 and spool 6. As described above, the forward cast begins with the elbow hanging comfortably at the side, at about waist level. During the back cast the elbow comes up to the level of the shoulder, and then during the forward cast it returns to the relaxed position at the side. Timing and rhythm are paramount, and the tip of the rod must move in a straight vertical plane during the forward cast. Consistent practice helps to develop a muscle memory such that the trainee can replicate the proper fly cast. The present invention is a modification to fly rods such as in FIG. 1 that allows the instructor to instill the proper muscle memory to the trainee. It allows the trainer to take the lead in controlling the casting while the trainee follows along, yet the trainer can gradually relinquish control to the trainee so that muscle memory develops through repetition.

Figure 2:
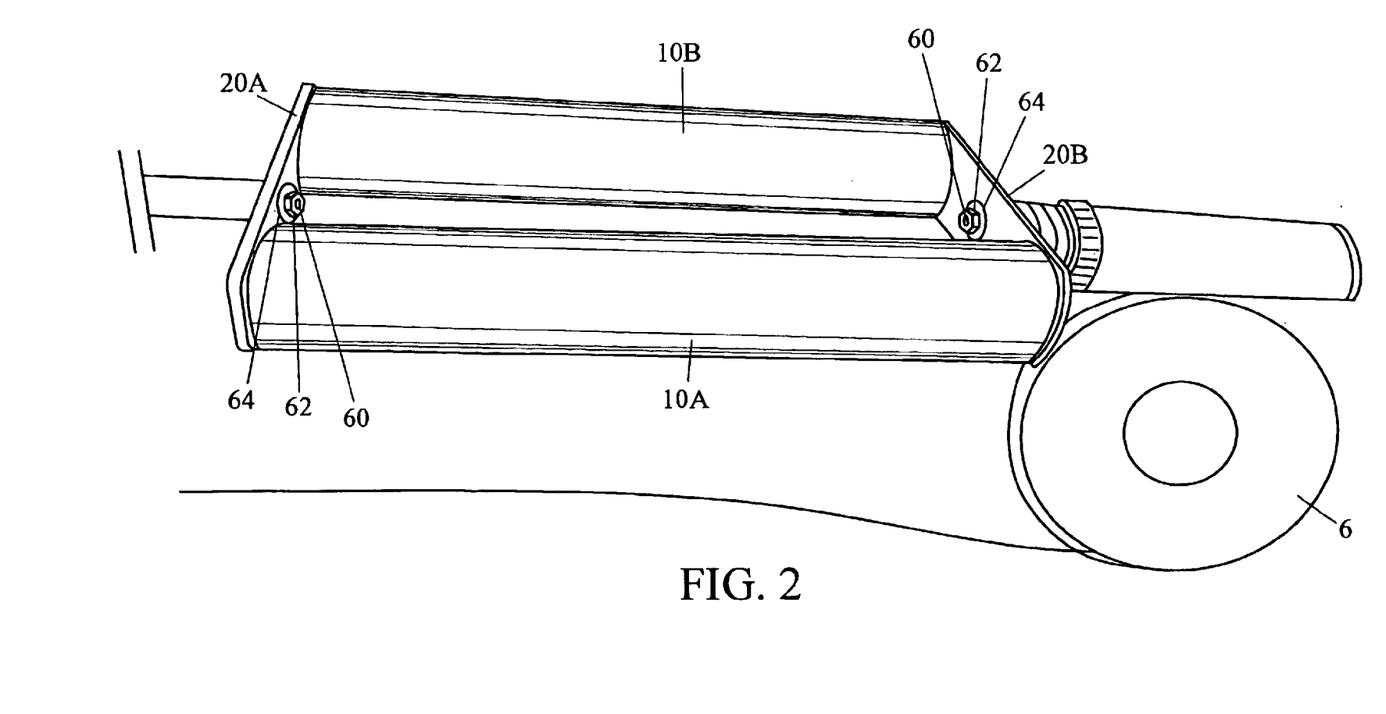
FIG. 2 is a perspective photo of a casting trainer according to one embodiment of the present invention incorporated by retrofit into a conventional fly rod 2 as in FIG. 1.

FIG. 2 is a perspective photo of a casting trainer according to one embodiment of the present invention incorporated by retrofit into a conventional fly rod 2 as in FIG. 1. The casting trainer comprises two spaced side-by-side handle segments 10a and 10b held at a predetermined lateral spacing about a central axis by brackets 20a and 20b. The handle segments 10a and 10b can be substantially parallel or slightly angled relative to each other. The rod 2 is sectioned at the base and the tip portion is attached to bracket 20a coaxial to the central axis. The base portion of rod 2 is attached to the other bracket 20b likewise coaxial to the central axis.

Figure 3:
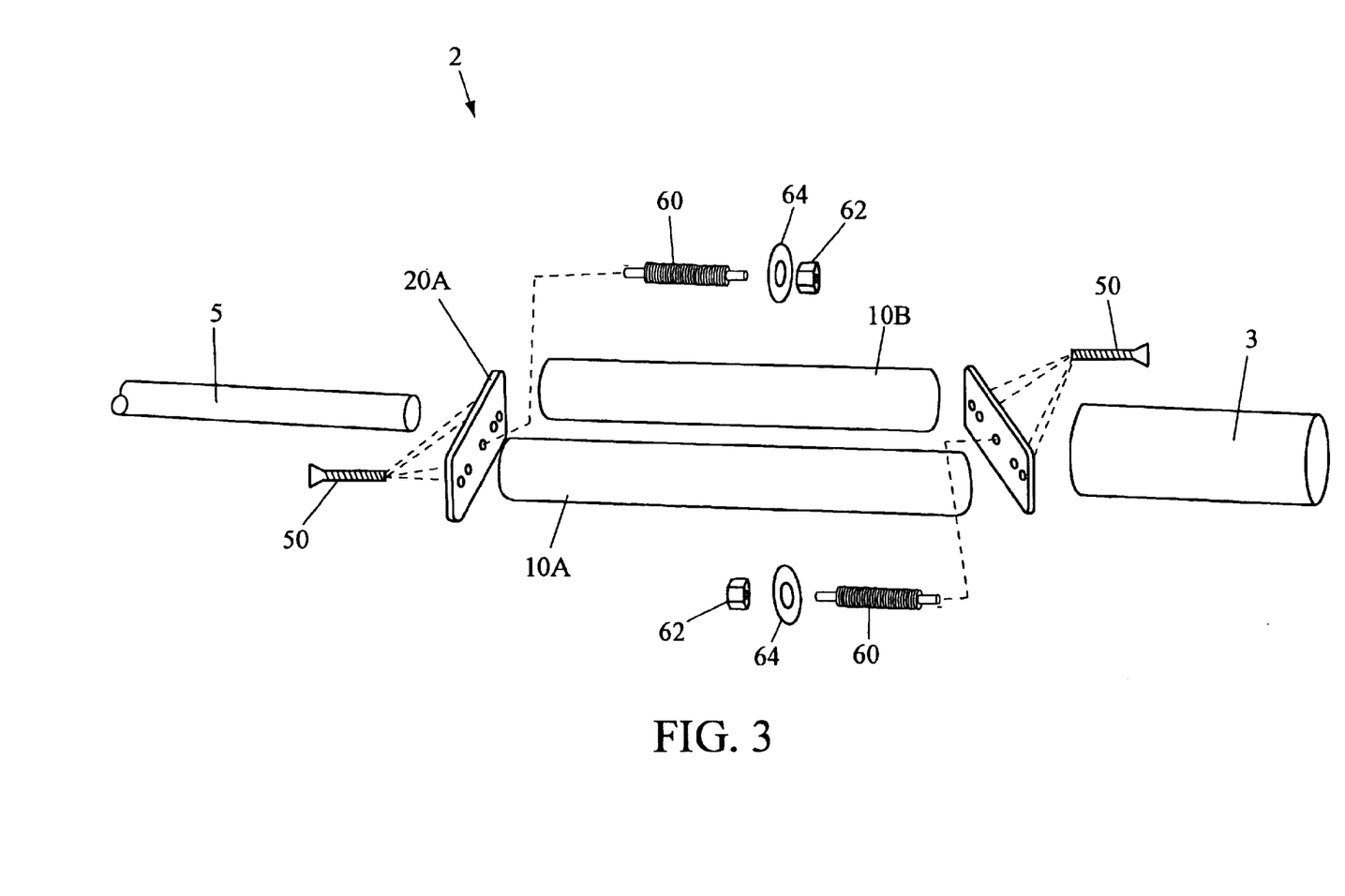
"FIG. 3 is an exploded view of the casting trainer of FIG. 2 illustrating a set of basic components for retrofit or original equipment manufacturer installation into the fly rod 2 of FIG. 1."

"FIG. 3 is an exploded view of the casting trainer of FIG. 2 illustrating a set of basic components for retrofit or original equipment manufacturer installation into the fly rod 2 of FIG. 1. Handle segments 10a and 10b are preferably cylindrical sections of like material cut to substantially equal (or slightly different) length. Wood, plastic, coated fiberglass and virtually any other material comfortable to the touch may be used."

Brackets 20a and 20b are identical flat strips of wood, metal or plastic with rounded edges for safety. Brackets 20a and 20b are each formed or drilled with at least three holes there through, and five holes are preferred. One to two holes are located on one side of each bracket for attachment of handle segment 10a via screw 50, and one or two holes are located on the other side of each bracket for attachment of handle segment 10b via a like screw 50. Two screws 50 and corresponding holes are preferred in order to prevent the handle segment 10 from rotating during use. The butt portion 3 of rod 2 is attached to bracket 20b via an anchor bolt 60 that is sunk coaxially into the tip. The anchor bolt 60 is then inserted through the center hole in bracket 20a and is fastened thereto by a hex bolt 62 seated on a washer 64. The flexible shaft portion 5 of rod 2 is similarly attached to the other bracket 20a coaxial to the central axis.

Figure 4:
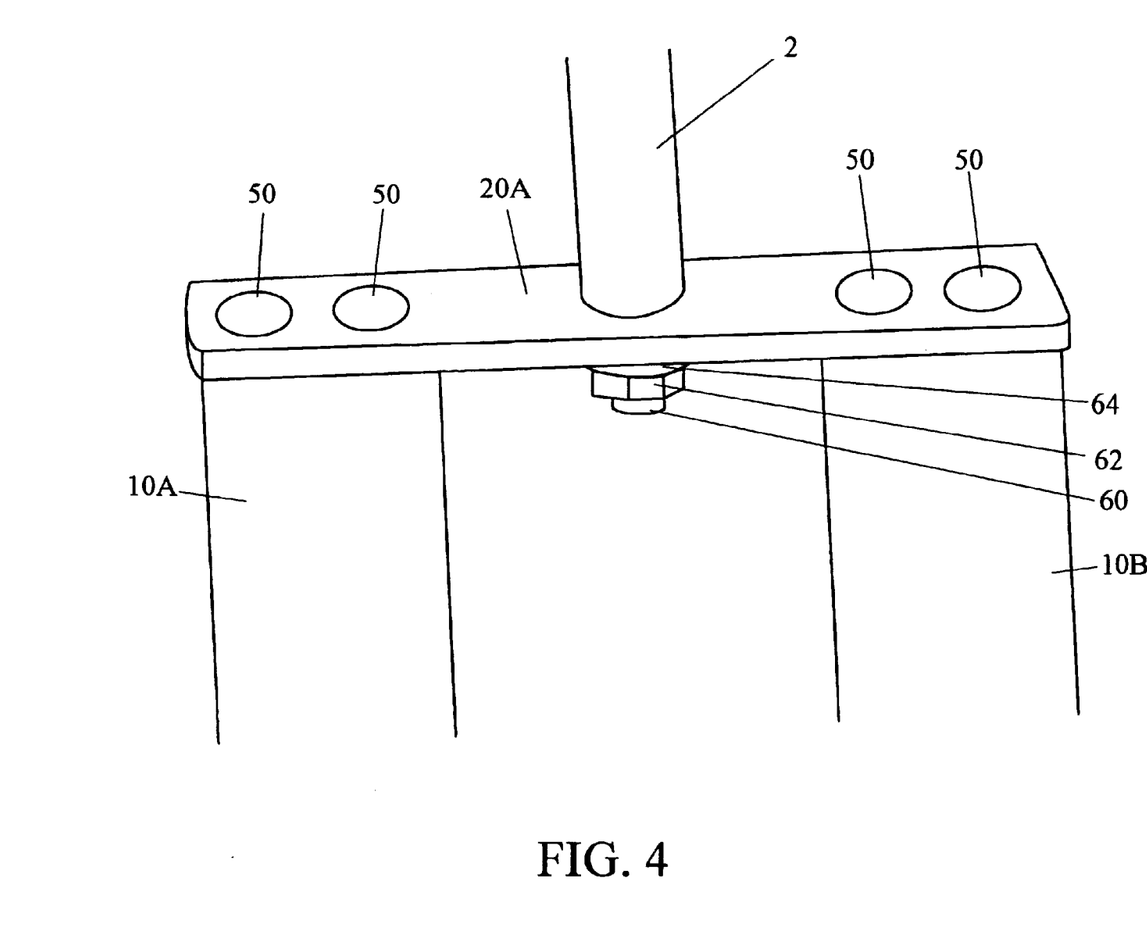
FIG. 4 is a close-up perspective photo of the casting trainer of FIGS. 2–3 illustrating screw placement.

FIG. 4 is a close-up perspective photo of the casting trainer of FIGS. 2–3 illustrating the above-described screw placement. The spool 6 shown in FIG. 2 hangs downward just below handle segments 10a and 10b.

The present invention includes the method of using the above-described casting trainer to impart a muscle memory of the proper back-and-forth motion of the forearm and rod to a fly casting trainee. In accordance with the method, trainer and trainee stand side-by-side and each grips one of handle segments 10a or 10b with their casting hand. At first, the trainer takes the lead in controlling the casting and the trainee follows along in order to get the feel and rhythm of the proper casting technique. The trainer gradually relinquishes control to the trainee and the trainee drives the casting (the trainer merely follows along for guidance). As a result of the gradual shift in control and repetitive motion, the trainee develops a muscle memory that is an exact reflection of the trainers casting technique. Given muscle memory, the trainee can later replicate the technique at will and without further guidance. The method and device of the present invention accomplish the most efficient fly cast training known. They are capable of imparting the proper fly casting technique to novices in mere minutes, whereas the traditional teaching method of visual demonstration can take hours.

The method and device of the present invention further allows an experienced fly casting enthusiast to develop proficiency with opposite-landed casting. A fly-fisherman who has mastered the technique of right handed casting, for example, may use the casting trainer to self-teach left handed casting technique. In accordance with the method, the experienced fly fisherman grips both handles of the device, one handle in each hand. The fisherman executes the cast with the dominant hand while the weaker hand follows along in order to get the feel and rhythm of the proper casting technique. Control of the cast is gradually shifted to the weaker hand, while the dominant hand maintains its grip on the second handle to maintain balance and control as the fisherman practices opposite-hand technique.

Figure 5:
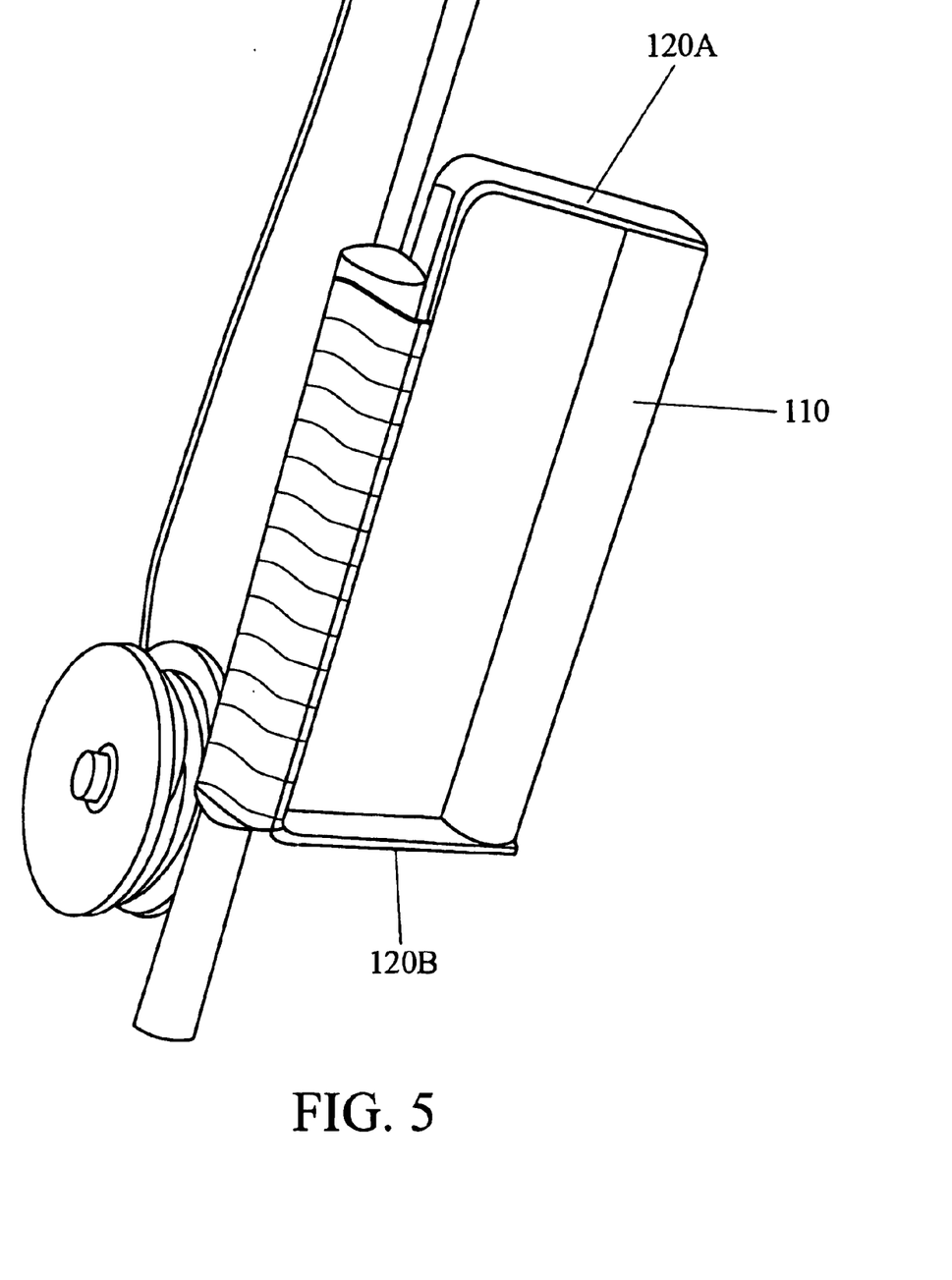
FIG. 5 is a perspective photo of an alternate embodiment of the casting trainer according to the present invention, again incorporated into a conventional fly rod 2 as in FIG. 1.
Figure 6:
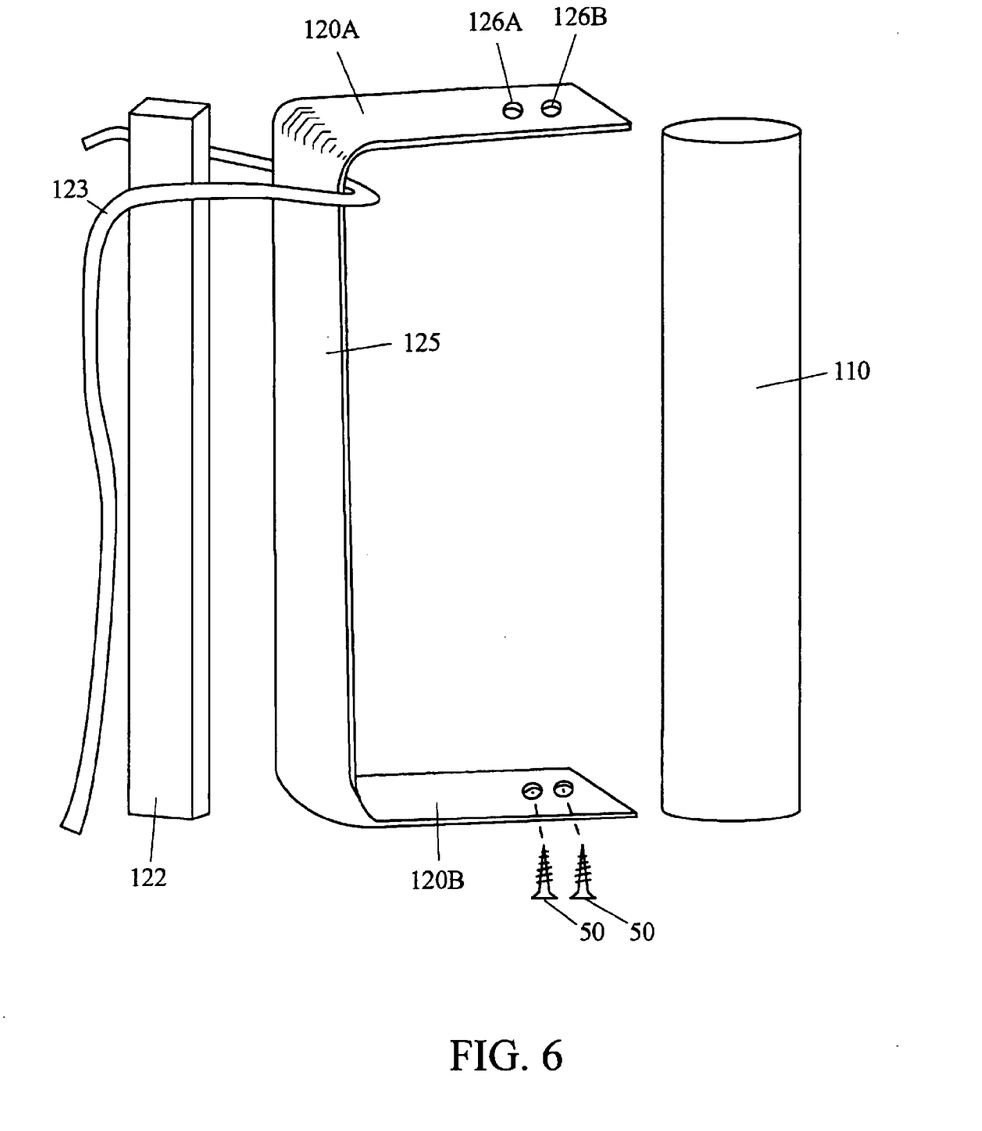
FIG. 6 is an exploded view of the casting trainer of FIG. 5 illustrating a set of basic components for retro-fit attachment of the training handle to an existing fly rod handle.

FIG. 5 is a perspective photo of an alternate embodiment of the casting trainer according to the present invention, again incorporated with a conventional fly rod 2 as in FIG. 1. Although this embodiment can be provided as original equipment, it is better suited for retrofit attachment to an existing fly rod 2 because there is no need to section the rod 2 as with the embodiment of FIG. 2. Thus, an instructor can use a rod 2 that they are accustomed to without fear of damage. The casting trainer of FIG. 5 uses the existing rod handle as shown, and secures a second training handle 110 an offset distance from the existing handle. To accomplish this, a double angle bracket 120 is used as shown in FIG. 6, with the training handle secured there between preferably by screws 50. As before, double-angle bracket 120 may be formed by bending an elongate strip to impart two spaced angles, and then pre-drilling the ends preferably with two holes 126a and 126b for attachment of handle 110 by two screws 50. A length of a malleable material 122 such as ordinary weather stripping is attached to the face of the bracket 125 which contacts the existing handle of the fly rod. This arrangement protects the permanent fly rod handle from damage from abrasion when the casting trainer is attached and in use. The mid-section of the double-angle bracket 120 is secured to the existing handle of the rod 2 preferably by a velcro strap 123. Tape or any other suitable fastening means may be substituted. The end sections of the double-angle bracket 120 need not be of equal length, and the angles of double-angle bracket 120 need not be right angles. These two characteristics may be varied as desired to impart different angles and/or offsets to handle 110. It is also noteworthy that the double-angle bracket 120 can be formed of discrete parts as a matter of design choice.

The method of using the casting trainer of FIGS. 5 and 6 is identical to the method described above with respect to the embodiment of FIGS. 2–4. Likewise, this embodiment successfully imparts a muscle memory of the proper back-and-forth motion of the forearm and rod to a fly casting trainee.

Figure 7:
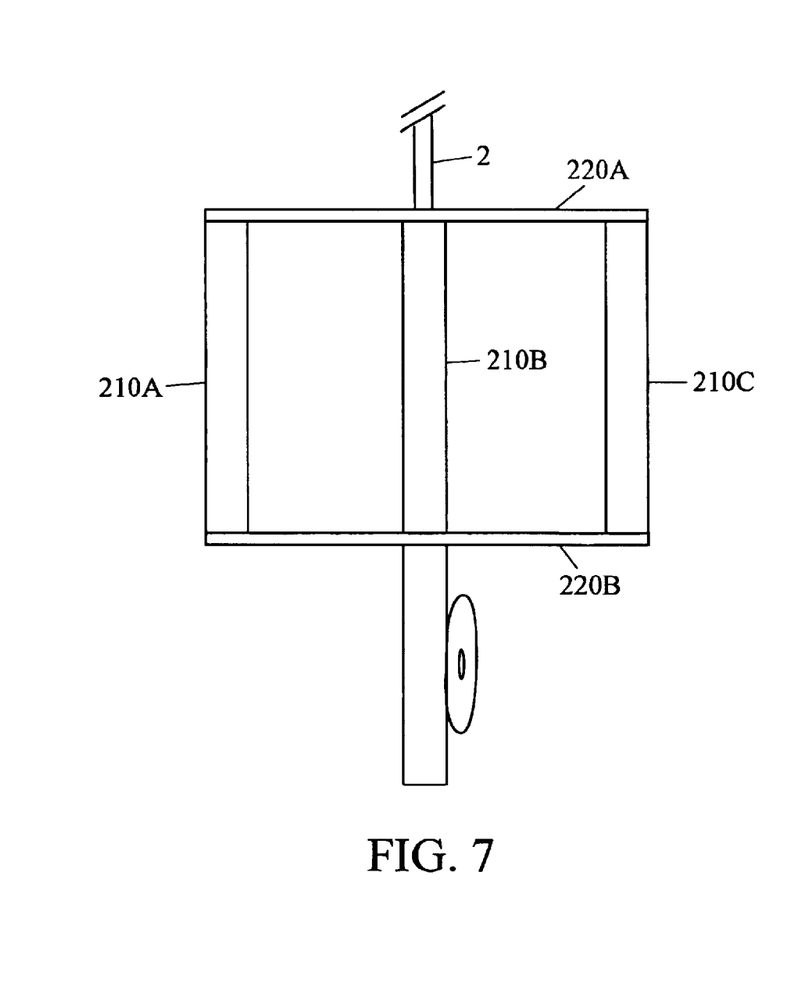
FIGS. 7 and 8 are front views of two alternate embodiments of the casting trainer according to the present invention.
Figure 8:
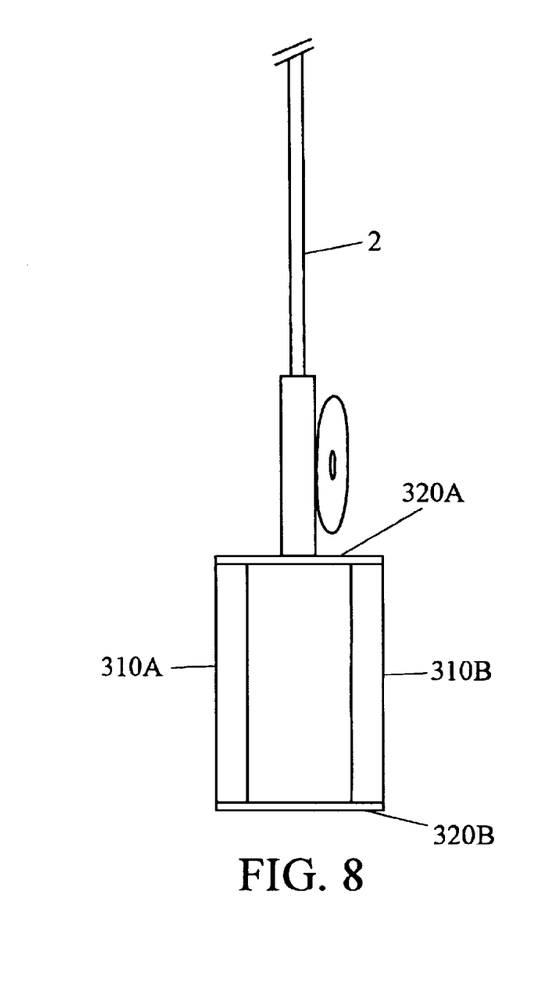

FIGS. 7 and 8 are front views of two alternate embodiments of the casting trainer according to the present invention.

The embodiment of FIG. 7 is similar to that of FIGS. 2–4 except that three spaced side-by-side handle segments 210a, 210b and 210c are all held at a predetermined lateral spacing by elongate brackets 220a and 220b. In this case, brackets 220a and 220b are formed or drilled with at least three holes each, and five holes are preferred. One or two holes are located on each side of each bracket for attachment of handle segments 210a and 210c via screws 50. The tip portion of rod 2 is then attached to bracket 220a via an anchor bolt that is threaded at both ends. The anchor bolt is sunk coaxially into the tip of rod 2. The other threaded end of the anchor bolt is then inserted through the center hole in bracket 220a and is fastened thereto by screwing in the pre-drilled and threaded center handle 210b. The butt portion of rod 2 is similarly attached to the other bracket 220b coaxial to the center handle 210b.

The method of using the casting trainer of FIG. 7 is identical to the methods described above except that the casting trainer can be used for left-handed trainees as well as right-handed trainees.

The embodiment of FIG. 8 is likewise similar to that of FIGS. 2–4 except that the brackets 320a and 320b and handles 310a and 310b assembly is attached to the end of the butt portion of the rod 2 (rather than sectioning the rod 2). This construction may be preferred where it is desirable to preserve the integrity of the rod 2. On the other hand, the balance of the rod 2 is affected as well.

Having now fully set forth a detailed example and certain modifications incorporating the concept underlying the present invention, various other modifications will obviously occur to those skilled in the art upon becoming familiar with said underlying concept. For example, any of the above-described embodiments can be used by a right-handed fisherman to self-teach left-handed casting, or vice versa. This is accomplished very simply by holding one handle with each hand and gradually shifting the primary casting hand from one to the other. This is continued until muscle memory builds in the secondary arm. It is to be understood, therefore, that within the scope of the appended claims, the invention may be practiced otherwise than as specifically set forth in the appended claims.

I claim:

1. A fly cast training device, comprising:
   a fly rod having a flexible shaft section and a butt section adjoining said flexible shaft section;
   a spool attached to said fly rod;
   a handle assembly for gripping said fly rod, said handle assembly including a plurality of handles secured together at their distal ends in a spaced relation.

2. The fly cast training device according to claim 1, wherein said plurality of handles further comprises a pair of spaced handles.

3. The fly cast training device according to claim 2, wherein said pair of spaced handles are secured together at their distal ends in a spaced relation by a pair of brackets, and said butt section is attached to one of said brackets centrally of said handles.

* * * * *